United States Patent
Sarca et al.

(10) Patent No.: US 8,428,101 B1
(45) Date of Patent: Apr. 23, 2013

(54) SYSTEM AND METHOD FOR INTERFERENCE TRIGGERED FREQUENCY HOPPING

(71) Applicant: Redline Communications, Inc., Markham (CA)

(72) Inventors: Octavian Sarca, Aurora (CA); Yuriy Popov, Markham (CA); Aurei Picu, Aurora (CA); Serban Cretu, Toronto (CA)

(73) Assignee: Redline Communications, Inc., Markham (CA)

( * ) Notice: Subject to any disclaimer, the term of this patent is extended or adjusted under 35 U.S.C. 154(b) by 0 days.

(21) Appl. No.: 13/670,158

(22) Filed: Nov. 6, 2012

Related U.S. Application Data

(63) Continuation of application No. 13/584,539, filed on Aug. 13, 2012.

(51) Int. Cl.
*H04B 1/69* (2006.01)
*H04B 1/707* (2006.01)
*H04B 1/713* (2006.01)

(52) U.S. Cl.
USPC .......... 375/133; 375/135; 375/136; 375/260; 375/132; 370/330; 370/344; 370/436; 370/437

(58) Field of Classification Search .......... 375/132–137, 375/260; 370/330, 344, 436, 347
See application file for complete search history.

(56) References Cited

U.S. PATENT DOCUMENTS

| | | | |
|---|---|---|---|
| 5,394,433 A * | 2/1995 | Bantz et al. ................... | 375/132 |
| 6,351,643 B1 | 2/2002 | Haartsen | |
| 6,501,785 B1 | 12/2002 | Chang et al. | |
| 7,116,700 B1 | 10/2006 | Sivakumar | |
| 7,756,058 B2 | 7/2010 | Cordeiro et al. | |
| 7,903,718 B2 | 3/2011 | Chu et al. | |
| 7,965,786 B2 | 6/2011 | Hu et al. | |
| 2006/0098715 A1 | 5/2006 | Amano | |
| 2008/0165754 A1 | 7/2008 | Hu | |
| 2008/0205487 A1 | 8/2008 | Hu et al. | |
| 2009/0190537 A1 | 7/2009 | Hwang et al. | |
| 2009/0286565 A1 | 11/2009 | Liu et al. | |

OTHER PUBLICATIONS

U.S. Appl. No. 13/584,539, filed Aug. 13, 2012.*
Bell, Thomas, Kevin Gajewski, and Anthony Hsu. "Pseudorandom Multiband Frequency Hopping for Interference Avoidance Using GNU Radio and USRP." from evernote.com, (2009).

(Continued)

*Primary Examiner* — Phuong Phu
(74) *Attorney, Agent, or Firm* — Nixon Peabody LLP

(57) ABSTRACT

Systems and methods of interference-triggered frequency hopping in a wireless communication system. A master is provided in the wireless communication system in wireless communication with slave nodes each configured to use different preselected communication frequencies to permit frequency hopping. A current channel is selected from among multiple channels in the wireless communication system in which the master and at least some of the slave nodes send and receive wireless communications. Each of the channels uses different ones of the preselected communication frequencies. In the current channel, interference with communications between the master and a selected one of the slave nodes that use the current channel is detected. A new channel is selected only in response to detecting the interference. The system switches from the current channel to the new channel such that communications between the master and the selected slave node use the new channel.

20 Claims, 5 Drawing Sheets

OTHER PUBLICATIONS

Rashid, KM Khairul, M. Adib Sarijari, Dahlia Nur, Rozeha A. Rashid, and Sharifah Kamilah Syed Yusof. "Parallel Spectrum Sensing and Data Transmission (PSSDT) for Opportunistic Spectrum Access.", (2008).

Yucek, Tevfik, and Huseyin Arslan. "A survey of spectrum sensing algorithms for cognitive radio applications." Communications Surveys & Tutorials, IEEE 11.1 (2009): 116-130.

Hu, Wendong, Daniel Willkomm, Murad Abusubaih, James Gross, George Vlantis, Mario Gerla, and Adam Wolisz. "Cognitive radios for dynamic spectrum access—Dynamic frequency hopping communities for efficient ieee 802.22 operation." Communications Magazine, IEEE 45, No. 5 (2007): 80-87.

Xiao, Yang, and Fei Hu, eds. Cognitive radio networks. Auerbach Publications, (2008).

Willkomm, Daniel, Mathias Bohge, Daniel Hollos, James Gross, and Adam Wolisz. "Double hopping: A new approach for dynamic frequency hopping in cognitive radio networks." In Personal, Indoor and Mobile Radio Communications, 2008. PIMRC 2008. IEEE 19th International Symposium on, pp. 1-6. IEEE, (2008).

Willkomm, Daniel. "Double Hopping: A new Approach for Dynamic Frequency Hopping in Cognitive Radio Networks" Daniel Willkomm, Mathias Bohge, Dániel Hollós, and James Gross, Technical University Berlin, Berlin, (Jan. 2008), TKN Technical Report TKN-08-001.

Golmie, N., O. Rebala, and N. Chevrollier. "Bluetooth Adaptive Frequency Hopping and Scheduling." Networking for Pervasive Computing 500 (2005): 111.

Bluetooth, Special Interest Group "Specification of the Bluetooth system, version 1.2, (2003).".

Golmie, Nada, Robert E. Van Dyck, Amir Soltanian, Arnaud Tonnerre, and Olivier Rebala. "Interference evaluation of Bluetooth and IEEE 802.11 b systems." Wireless Networks 9, No. 3 (2003): 201-211.

* cited by examiner

SYSTEM AND METHOD FOR INTERFERENCE TRIGGERED FREQUENCY HOPPING

CROSS REFERENCE TO RELATED APPLICATIONS

This application is a continuation of pending U.S. application Ser. No. 13/584,539, filed Aug. 13, 2012, which is incorporated herein by reference in its entirety.

BACKGROUND OF THE INVENTION

Frequency hopping is a well-known technique used in wireless communications systems to protect against interference or other channel impairments. However, it has the following drawbacks:

The overhead caused by constantly switching channels, during which time the system is unable to transmit information, increases as the bit rate increases because for a given amount of downtime, the amount of data that cannot be transmitted also increases. For example, for a 100 Mb/s link and 1 ms downtime, the amount of data which cannot be transmitted while frequency switching is going on, is 100 000 bits or 12.5 kBytes.

The interference produced and received in frequency hopping systems expands on all channels on which it hops.

The time it takes a communication slave to find its communication master is much longer if the master is continuously hopping.

In order to avoid this overhead, but enjoy all the advantages of frequency hopping, in the system described here, frequency hopping only occurs if interference is detected. If no interference is detected, no hopping occurs. Furthermore, since frequency hopping does not occur on a regular basis, there is less chance of interference to and from nearby systems. Since the system operates on a fixed frequency in the absence of interference, links can be established much faster on this system than in traditional frequency hopping systems.

BRIEF SUMMARY OF INVENTION

According to an aspect of the present disclosure, a method of interference-triggered frequency hopping in a wireless communication system includes: providing in the wireless communication system a master in wireless communication with a plurality of slave nodes configured to use different preselected communication frequencies to permit frequency hopping; selecting a current channel from among a plurality of channels in the wireless communication system in which the master and at least some of the slave nodes send and receive wireless communications, each of the channels using different ones of the preselected communication frequencies; detecting interference in the current channel with communications between the master and a selected one of the slave nodes that use the current channel; selecting a new channel of the channels different from the current channel only in response to detecting the interference; and switching from the current channel to the new channel such that communications between the master and the selected slave node use the new channel.

The method can further include maintaining wireless communications between the master and the selected slave node in the current channel such that no frequency hopping occurs away from the current channel until interference is detected in the current channel.

The detecting can be carried out by the master or by the selected slave node. The selecting the new channel can be based on a pre-defined frequency hopping algorithm or a pre-computed frequency hop sequence.

The method can further include, before switching to the new channel, determining a performance associated with a next channel of the channels different from the current channel, and if the performance fails to satisfy a channel performance criterion, selecting a further channel of the channels different from the current channel as the new channel; otherwise, if the performance satisfies the channel performance criterion, assigning the next channel as the new channel.

The channel performance criterion can include whether interference associated with the next channel is worse than the detected interference in the current channel such that the channel performance criterion is not satisfied if the interference associated with the next channel is worse than the detected interference in the current channel.

The channel performance criterion can include whether a wireless communication link is established in the next channel between the master and the selected slave node such that the channel performance criterion is not satisfied if the wireless communication link fails within a predefined timeout to be established between the master and the selected slave node.

The method can further include, before switching to the new channel, repeating, for a predetermined number of times: determining a performance associated with a next channel of the channels different from the current channel, and if the performance fails to satisfy a channel performance criterion, selecting a further channel of the channels different from the current channel as the new channel; and if, for any of the further channels selected, the performance fails to satisfy the channel performance criterion for the predetermined number of times, reverting to the current channel without switching to the new channel.

The pre-defined frequency hopping algorithm can include a random number generator such that the new channel is randomly selected from among the plurality of channels. The pre-defined frequency hopping algorithm can produce a hop sequence based on parameters, the parameters including a seed, a channel list, and a number of hops. The pre-computed frequency hop sequence can be based on a seed randomly generated by the master using a characteristic unique to the master, and wherein the frequency hop sequence is calculated by the master or by the selected slave node using the seed and a random number generator function. The pre-computed frequency hop sequence can be calculated by the master and communicated to the at least some of the slave nodes.

The detecting interference can include comparing an actual noise floor based on a received signal strength in the current channel and a signal to interference and noise ratio (SNR) with an expected noise floor. The expected noise floor can be calculated based on a thermal noise floor for the current channel and a receiver noise figure.

The comparing can include determining whether the actual noise floor exceeds the expected noise floor by a detection threshold, and if so, determining that interference is present in the current channel. The switching to the new channel can include announcing a channel switch announcement to the selected slave node, and responsive thereto, the selected slave node carrying out the switching to the new channel as determined by the pre-defined frequency hopping algorithm or in accordance with the pre-computed frequency hop sequence.

The switching to the new channel can include the master selecting the new channel, causing the selected slave node to lose communications with the master, and responsive thereto, the selected slave node carrying out the selecting the new channel as determined by the pre-defined frequency hopping algorithm or in accordance with the pre-computed frequency hop sequence.

The method can further include removing the current channel from a list of channels available for selection responsive to detecting interference. The method can further include storing the current channel in a list of unacceptable channels in which an unacceptable level of interference is present.

According to another aspect of the present disclosure, a non-transitory computer-readable medium encoded with instructions that, when executed by one or more processors, implement a method of interference-triggered frequency hopping in a wireless communication system, is provided. The method can carry out any combination of the methods described above.

DESCRIPTION OF THE INVENTION

The invention provides a mechanism for protecting against interference or, in general, against other channel impairments like flat fading. The system is equally applicable to point-to-point and point-to-multipoint systems.

Figure 1:
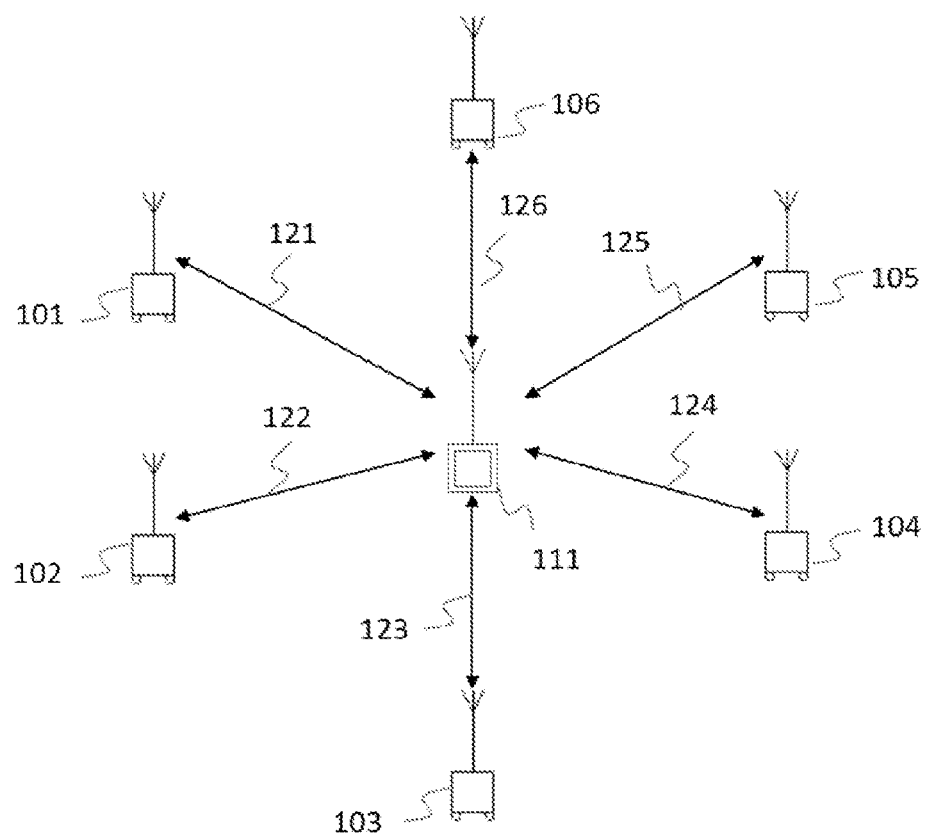
FIG. 1 shows a wireless communications system, including a master and 6 slave(s).
Figure 2A:
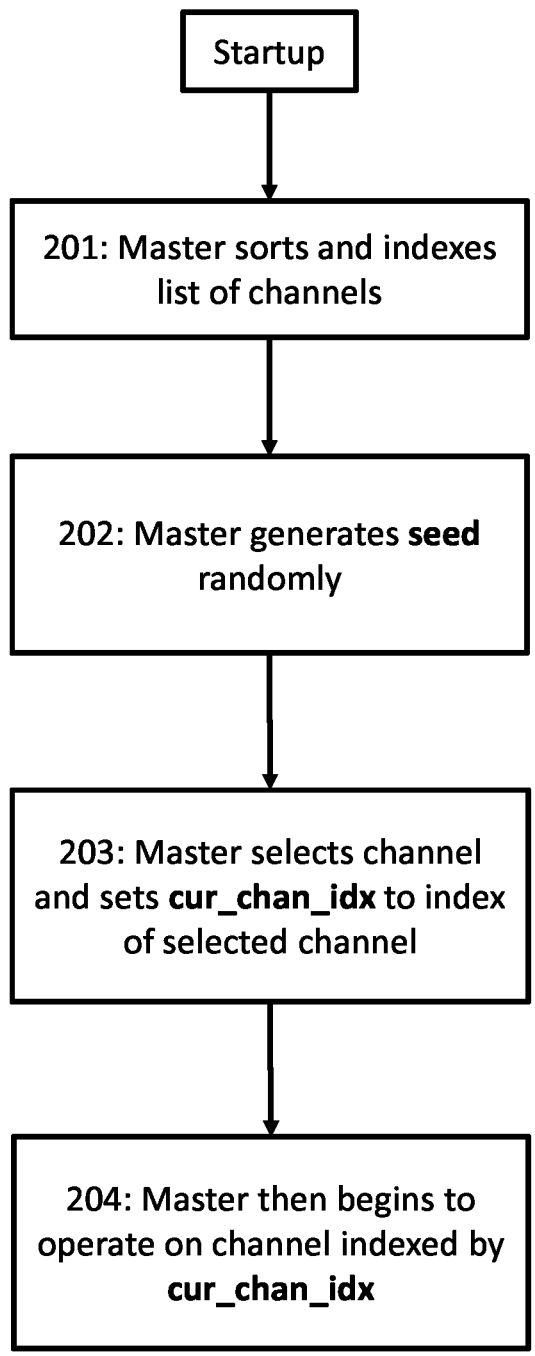
FIG. 2A shows an example master startup routine.

FIG. 1 shows a wireless system with master 111, and slaves 101, 102, 103, 104, 105 and 106 connected to master 111 over links 121, 122, 123, 124, 125 and 126. The master could be, for example, a base station or an access point. The slave could be, for example, a subscriber unit, a remote unit or a client.
Initialization FIG. 2A shows the startup routine for the master. The master has a list of channels which can be, for example, automatically generated or manually inputted by a user. This list can be, for example [5150; 5300; 5270; 5120; 5550] MHz. The master then sorts the list of channels using a criterion. The criterion for example, can include, but is not limited to, ascending or descending order of frequency. The list is then indexed from 0 to (nchannels-1); where nchannels is the number of channels used in the system.

For the example used with ascending order, the channels can be indexed as follows:
0=5120
1=5150
2=5270
3=5300
4=5550
with nchannels=5.

The master generates a seed randomly in step 202. Masters on adjacent systems will attempt to select different seeds to reduce the possibility of interference. To enable this, seed generation can be tied to a characteristic unique to a given master such as Media Access Control (MAC) address, serial number, or other unique identifying features associated with the master.

In step 203, the master selects a channel from the list. This selection can be performed using a variety of techniques, including but not limited to:
Random selection
Manual selection by a user
Scanning to find the best channel The master sets the current channel index, cur_chan_idx to the index of the selected channel.

In step 204, the master then begins to operate on the channel indexed by cur_chan_idx.

Figure 2B:
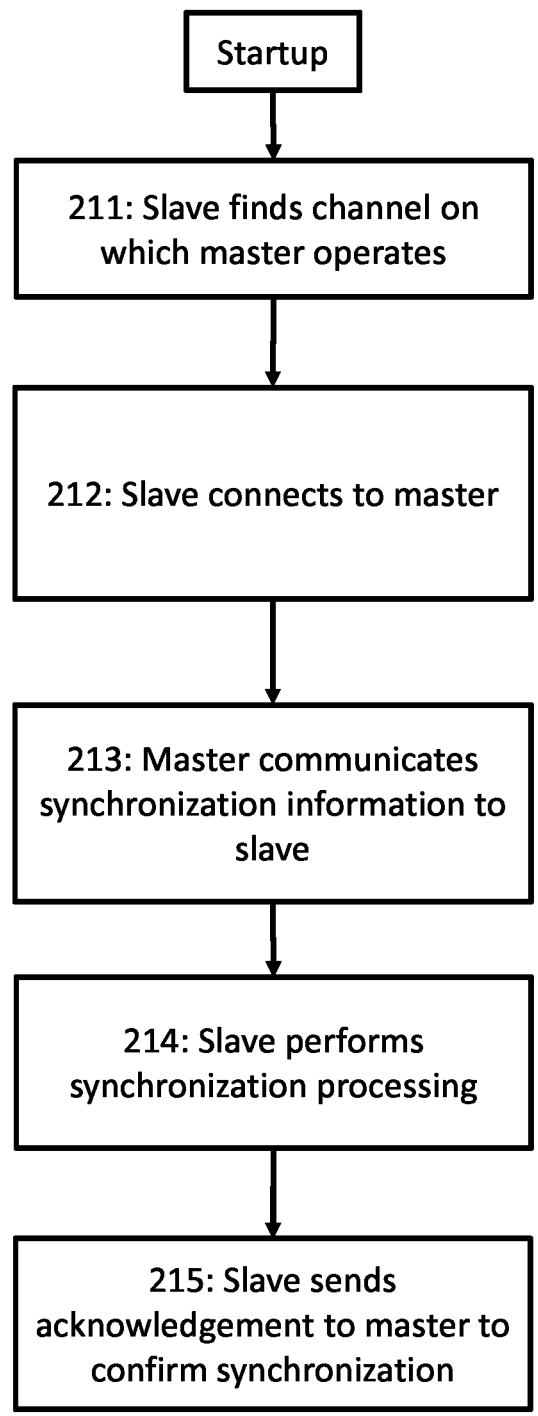
FIG. 2B shows an example slave startup routine.

FIG. 2B shows an example slave startup routine. In step 211, the slave scans or uses other ways to find the channel on which the master operates. In one embodiment, the slave(s) have a list of supported channels that is much larger than the list of channels available to the master. In yet another embodiment, the slave(s) have a list of supported channels which is exactly the same as that available to the master.

In step 212, after it finds the master, the slave connects to it.

In step 213, once the slave connects to the master, the master communicates synchronization information to the slave. The synchronization information can include, but is not limited to, for example:
A seed;
A list of channels. For example, if the list of channels supported by the slave(s) is larger than that available to the master, then the master transmits a list of available channels to the slave(s).
A compressed list of channels, which could be, for example, a range of frequencies or a list of ranges of frequencies used by the master.
A pre-computed frequency hop sequence (further explanation on the generation of the frequency hop sequence is given below and in the section titled "Frequency hopping process when interference is detected")
A maximum number of jumps Nchchg
Information to allow the slave to synchronize its clock to the master In step 214, once the slave(s) receive the synchronization information from the master, the slave(s) perform synchronization processing using this information. Synchronization processing can involve different steps. For example, if the slave(s) receive a list of channels from the master, the slave(s) order the list of channels using the same criterion as the master, and derive the channel indexes in a similar manner to that of the master. In another example, if a compressed list of channels such as a range of frequencies is transmitted to a slave, the slave uses a decompression algorithm to obtain the list of channels. The slave(s) set cur_chan_idx to the same value as that used by the master. Other steps can be performed as part of the synchronization processing, such as slave clock synchronization.

In step 215, once the synchronization processing is complete, the slave(s) send an acknowledgement to the master to confirm that the slave(s) are synchronized to the master. The master keeps track of the slaves that are synchronized using the acknowledgment sent by each slave.

Figure 2C:
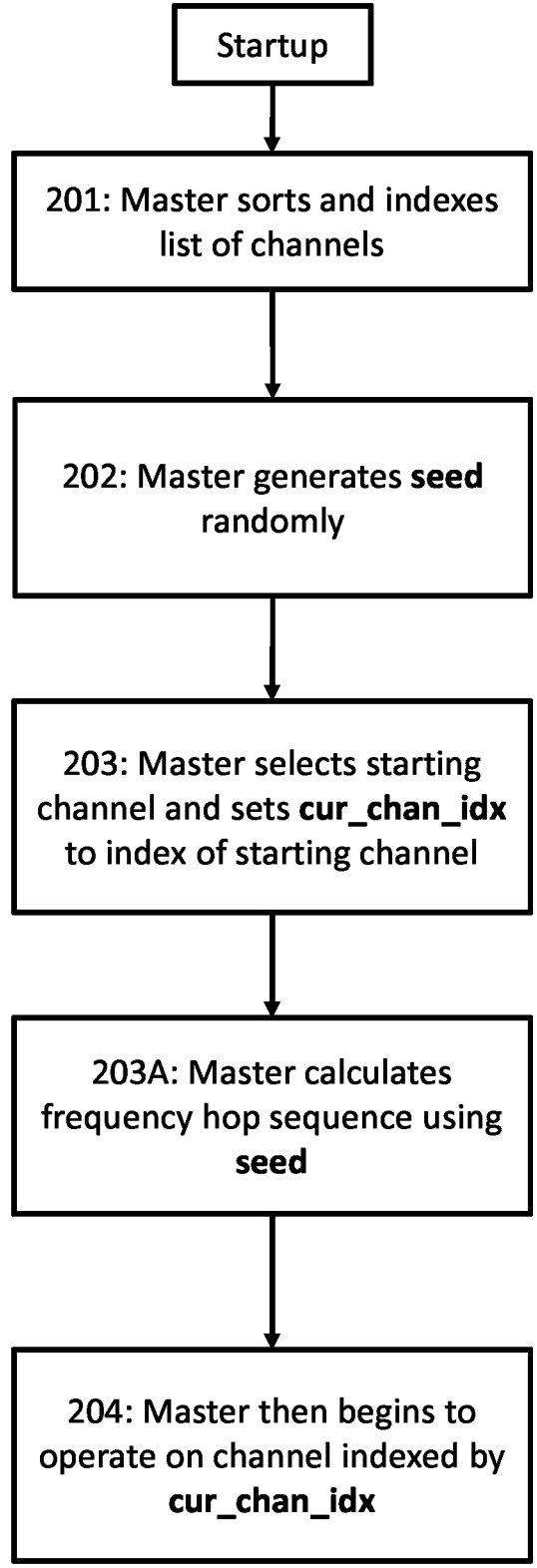
FIG. 2C shows an alternative master startup routine.

In another embodiment, the master startup routine includes the following additional step 203A as shown in FIG. 2C: After the seed is generated, the master calculates a frequency hop sequence of channel indexes of length Nchchg using the seed. Further details of this calculation are provided below in the section titled "Frequency hopping process when interference is detected". This pre-computed frequency hop sequence is stored for use in case of interference. In an embodiment, the master alone computes the frequency hop sequence, and then transmits the frequency hop sequence to the slave(s) as part of the synchronization information. In another embodiment, the slave(s) receive the seed from the master as part of the synchronization information, and as part of the synchronization processing, the slave(s) compute the frequency hop sequence before sending the acknowledgement to confirm that the slave(s) are synchronized to the master.

If a new slave joins the system, the master and new slave must synchronize with each other using the same process outlined above. In an embodiment, the master and slave(s) communicate the synchronization information securely using techniques such as public key encryption.

Detection of Interference

Interference may be detected on cur_chan_idx through a variety of ways.

For example, in an embodiment, the master and slave(s) measure the actual noise floor by measuring the power of the received signal during the communication gaps when no master or slave is transmitting, and make decisions about interference based on the noise floor. For example, if the master and slave(s) find that the actual noise floor has increased sufficiently over an expected noise floor, then the master may indicate to the slaves that there is interference present in the channel.

In another example, the actual noise floor can be evaluated from the received signal strength (RSSI) and from the signal to interference and noise ratio (SNR) during transmission as follows:

Actual Noise Floor (dB)=RSSI (dB)−SNR (dB)

The expected noise floor can be calculated as:

Expected Noise Floor (dB)=TNF+NF where TNF=thermal noise floor for the channel in dB
NF=receiver noise figure (dB)

Then, the noise floor increase can be calculated as:

Noise Floor Increase (dB)=max{(Actual Noise Floor−Expected Noise Floor),0}

The Receiver Noise Figure of a receiver is the difference in dB between the noise at the output of the actual receiver and the noise at the output of an ideal receiver with the same bandwidth, where the noise at the output of the actual receiver is the amplified thermal noise floor combined with extra noise introduced by the receiver itself while the noise at the output of the ideal receiver is just the amplified thermal noise floor.

Figure 3:
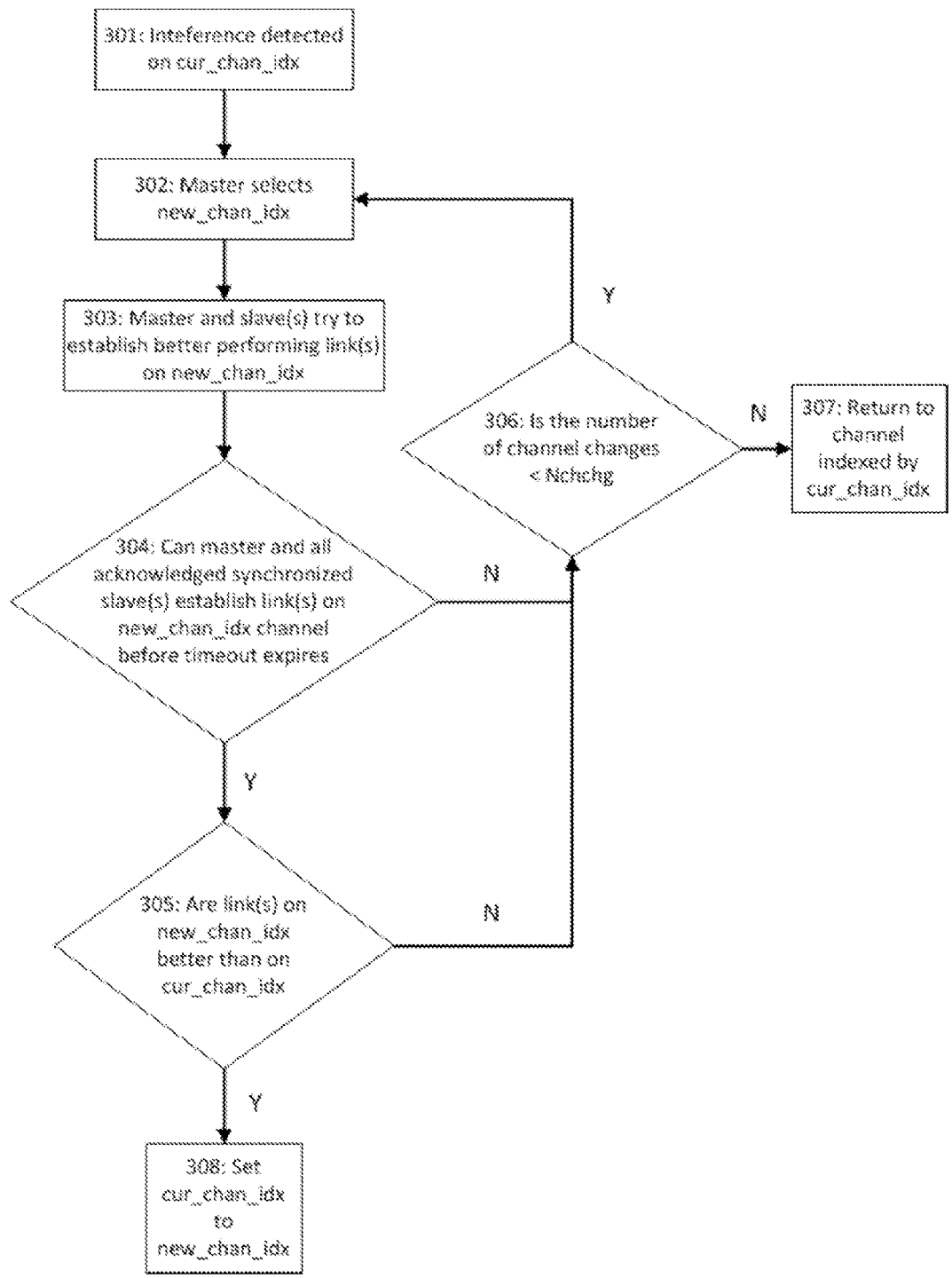
FIG. 3 shows an embodiment of frequency hopping.

In another embodiment, as part of the interference detection process, the noise floor increase is compared to detection threshold(s). The detection threshold(s) can be fixed, or set adaptively using a variety of techniques, including historical data analysis and adaptive techniques. Detection threshold(s) can be set manually by an operator, via automated techniques, or through a combination of automated and manual techniques, for example an operator can manually override detection threshold(s) set via an automated mechanism Frequency Hopping Process when Interference is Detected FIG. 3 is a flowchart to illustrate an example frequency-hopping system according to aspects of the present disclosure.

In step 301, interference is detected on cur_chan_idx. Interference detection has previously been explained. Interference can be detected on the channel indexed by cur_chan_idx by the master or the slave(s). If interference is detected by the slave(s), the slave(s) will notify the master.

The master can initiate a channel switch as follows:

In step 302, the master then selects a new channel index new_chan_idx.

In an embodiment, the system performs this selection "on-the-fly", that is, a new_chan_idx is selected when interference is detected, using a pre-defined frequency hopping algorithm. In an example frequency hopping algorithm, the master inputs the random seed, nchannels and cur_chan_idx into a generating function randomfn( ), to generate the new channel index new_chan_idx, e.g.,:

new_chan_idx=randomfn(cur_chan_idx, seed, nchannels)

An example of randomfn( ) could be:

new_chan_idx=(cur_chan_idx+rand( )) *(nchannels-1)/RND_MAX) % nchannels;

where rand( )is a random number generator function which generates numbers in the range between [0,RND_MAX], and is initialized using seed.

In another embodiment, as explained in the section titled "Initialization", the master, or the master and slave(s), calculate a frequency hop sequence of channel indexes of length Nchchg using the seed. In an embodiment, the master, or the master and slave(s) can calculate this sequence by repeatedly performing randomfn( ) Nchchg times, and store the result of the calculation every time. As explained above, if the master alone calculates this sequence, the master will transmit the frequency hop sequence to the slave(s) as part of the synchronization information. Alternatively, if the master and the slave(s) calculate the frequency hop sequence, the seed is transmitted as part of the synchronization information, and the slave(s) calculate the frequency hop sequence in the same way as the master as part of the synchronization processing. If interference is detected, the master selects new_chan_idx from the pre-computed frequency hop sequence.

In step 303, after the master selects new_chan_idx, the master and the slave(s) try to establish better performing links on new_chan_idx. There are different possible embodiments to achieve this.

In an embodiment, the master announces several times to the slaves that a channel change will occur at time $T_{ch}$. At time $T_{ch}$, the master switches to the channel indexed by new_chan_idx. A synchronized slave that receives a channel switch announcement from the master will know that it has to switch channel at time $T_{ch}$. In an embodiment, the synchronized slave(s) select(s) the new_chan_idx either using the same pre-defined frequency hopping algorithm as the one used in the master, or from the same pre-computed frequency hop sequence as the master. This embodiment requires that the master and slave clocks must be synchronized to each other, so that the jump will occur simultaneously for the slaves that received a channel switch announcement from the master. Announcing the channel switch helps reduce the system transmission interruption time and increase throughput. If the master sends out a channel switch announcement and a synchronized slave does not receive the channel switch announcement, then at time $T_{ch}$, when the master switches channels, the slave will lose its wireless link to the master. The slave selects new_chan_idx using one of the methods outlined above, and switches to the channel indexed by new_chan_indx.

In an alternate embodiment, the master announces that a channel change will occur in X seconds, and after X seconds have elapsed, the master switches to the channel indexed by new_chan_idx. In another embodiment, the master makes several announcements, but each time it decrements the time until the channel change. For example:

Announcement 1 at time t=0 seconds: Master announces that a change will take place in X seconds Announcement 2 at time $t=\Delta_1$ seconds: Master announces that a change will take place in $(X-\Delta_1)$ seconds Announcement 3 at time $t=\Delta_2$ seconds: Master announces that a change will take place in $(X-\Delta_2)$ seconds and so on. Therefore, in this example, if a synchronized slave does not receive announcement 1 but receives announcement 3, it will know it has to make a switch in $(X-\Delta_2)$ seconds time. This embodiment has the advantage that even if the master and slave clocks are not synchronized to each other, the slave(s) will know when the master will switch channels.

Then, similar to as explained above, the synchronized slave(s) select(s) the new_chan_idx using one of the methods explained above. If the master sends out the channel switch announcements and a synchronized slave does not receive any of the channel switch announcements, when the master switches channels, the slave will lose its wireless link to the master. The slave will select new_chan_idx using one of the methods outlined above, and switch to the channel indexed by new_chan_indx.

In yet another embodiment, the master switches channel after making N announcements. A synchronized slave receiving any of the N announcements will know that it has to make a channel switch. This embodiment also has the advantage that even if the master and slave clocks are not synchronized to each other, a synchronized slave receiving at least one of the announcements will know that a switch will occur. Then, as explained above, the synchronized slave(s) select(s) the new_chan_idx using one of the methods explained above. As explained previously, if the master sends out the channel switch announcements and a synchronized slave does not receive any of the channel switch announcements, then when the master switches channels, the slave will lose its wireless link to the master. The slave will then select new_chan_idx using one of the methods outlined above, and switch to the channel indexed by new_chan_indx.

In another possible embodiment, after the master selects new_chan_idx, the master switches channel at time $T_{ch}$, without announcement. All synchronized slaves will lose their wireless link to the master. The slaves will then select new_chan_idx using one of the methods outlined above, and switch to the channel indexed by new_chan_indx.

The master and all the synchronized slave(s) try to establish link(s) on the channel indexed by new_chan_idx before a predefined timeout expires. All the synchronized slaves will hop using the same pseudorandom sequence of channels as the master. Slaves that are unsynchronized will lose connectivity and will have to begin scanning for the new channel.

The master checks to ensure that all of the synchronized slave(s) which have sent acknowledgements to the master have been reconnected. (step 304)

If the master and all of the acknowledged synchronized slave(s) successfully establish better-performing link(s) within the predefined timeout, (step 305) then cur_chan_idx is set to new_chan_idx. (step 308)

If any of the links between the master and the acknowledged synchronized slaves fails to establish on the channel indexed by new_chan_idx within a predefined timeout (step 306), or the channel performance is worse than the channel corresponding to cur_chan_idx (step 307): First, the master will check to ensure that the number of channel changes performed is less than Nchchg (step 308). If yes, the master will return to step 302, that is the master will select new_chan_idx using the same predefined frequency hopping algorithm or the same pre-computed frequency hop sequence, and try to establish a better performing link on the channel indexed by new_chan_idx. The master and the acknowledged synchronized slave(s) repeat this process until they successfully establish a better-performing link than the one on the channel indexed by cur_chan_idx, (step 308) or the number of channel changes is equal to Nchchg (step 306). The latter can happen:

if the predefined frequency hopping algorithm is used, they reach the maximum number of channel changes Nchchg, or if the pre-computed frequency hop sequence is used, they reach the end of the pre-computed frequency hop sequence of length Nchchg.

If the number of channel changes is equal to Nchchg (step 307), the master and the acknowledged synchronized slaves will return to the channel indexed by cur_chan_idx to attempt to re-establish the link.

In an embodiment, if the master and all of the acknowledged synchronized slave(s) successfully establish better-performing link(s) within the predefined timeout, a new random seed is generated at the master and transmitted to the slave(s). By doing so, the system enjoys further immunity to jamming and interception, as the pseudo-random channel sequence is being continually updated and refreshed. If the master and acknowledged synchronized slave(s) are configured to pre-compute frequency hop sequences, the master, or the master and slave(s) will use this new random seed to pre-compute a new frequency hop sequence of length Nchchg, erase the old pre-computed frequency hop sequence and store this new pre-computed frequency hop sequence for use in case of interference.

In another embodiment, if the master and the acknowledged synchronized slaves return to the channel indexed by cur_chan_idx to attempt to re-establish the link, and if one or more of the acknowledged synchronized slaves fail to reconnect on the original channel they will be de-registered and will use auto-scanning to find the master. In an embodiment, once the master and acknowledged synchronized slave(s) re-establish a link on the channel indexed by cur_chan_idx, then after a pre-set time interval $T_{set}$, the master and acknowledged synchronized slave(s) will perform frequency hopping again, using the same seed as before.

In an alternative embodiment, once the master and acknowledged synchronized slave(s) re-establish a link on the channel indexed by cur_chan_idx, a new random seed is generated at the master and transmitted to the slave(s). In yet another alternative embodiment, either the master calculates a frequency hop sequence of channel indexes of length Nchchg using the seed and transmits the frequency hop sequence to the slave(s); or the master transmits the seed to the slave(s) and computes the frequency hop sequence. Then, after a pre-set time interval $T_{set}$, the master and acknowledged synchronized slave(s) will perform frequency hopping again, either using the same pre-defined frequency hopping algorithm as before; or using the new pre-computed frequency hop sequence. This has the advantage, in the event that a malicious jammer either intercepts or guesses the previous seed, the sequence can be started afresh, and the jammer is less likely to be able to discern the frequency sequence being used.

In another embodiment, if interference was detected on a channel indexed by cur_chan_idx by either the master or one or more of the slave(s), the master is notified, and the channel is marked by the master as "bad" or unacceptable. The master then removes this channel from the list of channels, and notifies the slave(s) of the removal by either broadcasting the new list of available channels or broadcasting that a channel should be removed from the list. The slaves update their respective lists of channels.

In another embodiment, if an attempt to establish a link on the channel indexed by new_chan_idx was unsuccessful or if the link was worse than the channel indexed by cur_chan_idx, the channel indexed by new_chan_idx is marked as "bad" or unacceptable. The master removes this channel from the list of channels, and notifies the slave(s) of the removal by either broadcasting the new list of channels or broadcasting that this channel should be removed from the list. The master can also add this channel to a list of "bad" channels. The slaves will then update their list of channels. If a "bad" or unacceptable channel is selected, either "on the fly" or from a pre-computed frequency hop sequence, both the master and the slave(s) will reject this choice. Optionally, if the master and slave(s) are using a pre-computed frequency hop sequence, the master and slave(s) may remove this channel from the frequency hop sequence.

In an embodiment, after a fixed period of time the channel is returned to the list of channels. If the master maintains a list of "bad" or unacceptable channels, the channel is removed by the master from the "bad" or unacceptable channel list. The master notifies the slave(s) of the return to the list of channels, either by broadcasting the new list of channels or broadcasting the return of the channel. The slaves will update their list of channels. This channel can now be selected. Optionally, if the master and slave(s) are using a pre-computed frequency hop sequence, and this channel was previously removed from the frequency hop sequence, the master and slave(s) restore the channel to the frequency hop sequence.

In another embodiment, the system alternates between data transmission and scanning to determine which channels are performing well. Channel scanning is only carried out during a small portion of the time so as to not limit system throughput.

In another embodiment, the master and the slave(s) are capable of performing simultaneous scanning and data transmission using multiple radios, and some of these radios will scan in the background on a different channel to that indexed by cur_chan_idx. The background scanning can be hardware or software implemented.

In an embodiment, the master and slave(s) select the scan channel index scan_chan_idx using the pre-determined frequency hopping algorithm, and scan the channel indexed by scan_chan_idx. If it is likely that the system could establish a link which performs above a threshold on the channel indexed by scan_chan_idx, scan_chan_idx is stored. If there is future interference on cur_chan_idx, new_chan_idx can be set to scan_chan_idx. If however, the channel indexed by scan_chan_idx performs below the threshold, the channel indexed by scan_chan_idx is marked as "bad" or unacceptable by the master. The master will either transmit the new list to the slaves, or transmit that the channel indexed by scan_chan_idx has been removed from the list. The master can also add this channel to a list of unacceptable channels. The master and slave(s) use the random seed to select a new scan_chan_idx using the pre-determined frequency hopping algorithm, and scan the channel indexed by scan_chan_idx. The master and slave(s) repeat this process until a channel that is likely to perform above threshold is found. If a channel is not found before interference occurs on the channel indexed by cur_chan_idx, the seed is used to compute a new_chan_idx using the pre-defined frequency hopping algorithm and frequency hopping occurs as previously explained.

In another embodiment, if there is a pre-computed frequency hop sequence, the master and slave(s) will set scan_chan_idx to the next entry on the sequence while transmission on channel cur_chan_idx is occurring. If the channel indexed by scan_chan_idx performs above threshold, then scan_chan_idx is stored. If there is future interference on cur_chan_idx, new_chan_idx can be set to scan_chan_idx. If the channel indexed by scan_chan_idx performs below threshold, the master marks this channel as acceptable and removes it from the list of channels. The master may also add this channel to a list of unacceptable channels. The master will either transmit the new list to the slaves, or transmit that the channel indexed by scan_chan_idx has been removed from the list. The slaves will update their lists and the sequence accordingly. The master and the slave(s) set scan_chan_idx to the next entry in the sequence, and repeat the process. In an embodiment, the master additionally uses the random seed to generate new entries for the frequency hop sequence, and adds this to the sequence. The master will also transmit the new entries to the slave(s) so that they can update their sequences as well. If a channel is not found before interference occurs on the channel indexed by cur_chan_idx, the seed is used to compute a new_chan_idx and frequency hopping occurs as previously explained.

In another embodiment, the master and slave(s) scan the channels in the list of unacceptable channels to determine whether the performance of channels in the list has improved. In an embodiment, the master and slave(s) scan each channel in the unacceptable list periodically. If the performance of a channel has improved, the channel is restored to the list of channels by the master. The master notifies the slave(s) either by transmitting the new list to the slaves, or by transmitting the removal of the channel from the unacceptable list and the restoration to the list of channels to the slave(s).

In another embodiment, the master and slave(s) alternate between scanning channels in the list of unacceptable channels to determine if channel performance has improved, and scanning the next channel in the sequence to determine whether it is a suitable candidate to hop to.

In another embodiment, if the system cannot establish a new link within Nchchg jumps or before the end of a pre-computed frequency hop sequence, and the system has returned to cur_chan_idx: The radios assigned to background scanning will scan channels set according to the pre-defined frequency hopping algorithm while the system is waiting for the pre-set time interval $T_{set}$ to end. If the radios used to perform background scanning are able to find a suitable channel, the master will transmit this result to the slave(s), and the system can jump to this channel.

In addition to generating a pre-computed sequence using a seed, it is also contemplated to generate a pre-computed sequence of channels based on performance rankings of the channels. Rankings can be assigned based on their past performance, or based on results obtained by background scanning.

In an embodiment, the master generates the pre-computed sequence of channels based on performance rankings of the channels. Then, a pre-computed sequence based on channel rankings is transmitted to the slaves.

Ranking can also be combined with random selection. In an embodiment, weighted random selection can be used to select channels. Higher weights are assigned to better performing channels, so that there is a higher likelihood that these channels be selected.

In another embodiment, a tiered list of the channels can be created. To achieve this, the master keeps a running count of the time that a channel spends on the unacceptable list within a given duration, for example, the 24 hours preceding the current time. If the running count for a given channel exceeds a threshold, the master tags this channel.

In the case of a two-tiered list, the master partitions the list of available channels into the following 2 tiers
  Tier 1: Channels where the running count has not exceeded the threshold
  Tier 2: Channels where the running count has exceeded the threshold
When the channel re-enters the list of available channels, it is considered a Tier 2 channel. If the running count drops below the threshold, the master removes this tag, and notifies the slave(s) of the tag removal. The channel is moved up into Tier 1.

When a sequence is pre-computed, after generation the sequence is reordered so that the Tier 2 channels are moved towards the end of the sequence, and the Tier 1 channels are listed at the start of the sequence.

In the case of a three-tiered list, there are two thresholds, an upper threshold and a lower threshold. Tier 1 includes the best performing channels, Tier 2 includes the next best performing channels, and Tier 3 includes the worst performing channels. If, for a given channel, the running count is below the lower threshold, it is placed in Tier 1. If the running count is above the lower threshold but below the upper threshold, it is placed in Tier 2. If the running count is above the upper threshold, it is placed in Tier 3.

The sequence can be reordered so that Tier 1 channels are the earliest within the sequence, Tier 2 are next earliest, and Tier 3 channels are the last channels in the sequence. Then, when the master and slave(s) perform frequency hopping, it makes it more likely that the system will hop into a channel with better performance than channel cur_chan_idx within the maximum number of jumps Nchchg.

It is possible that a given channel can move, for example from Tier 1 to Tier 2 if the running count worsens. Conversely, it is possible that a given channel can improve, for example, from Tier 3 to Tier 2, if the running count improves.

It can be seen that this can be generalized to an S-tiered list with (S-1) thresholds, where S is greater than or equal to 2. Channels will be placed into the appropriate tier depending on their running count.

The threshold(s) can be determined by analyzing historical records, or by automated methods, for example, using adaptive algorithms. These thresholds can be set automatically or manually by an operator, or through a combination of automatic and manual methods, for example, an operator can manually override threshold(s) set via an automated mechanism.

In another embodiment, an operator has access to the system via a user interface. The operator can use the interface for many purposes, for example, to decide whether the system pre-computes a sequence of channels, and chooses new_chan_idx from this sequence; or chooses new_chan_idx on the fly. The operator can use the interface to adjust the detection threshold, as explained previously. In addition to the automated processes specified above, the operator can then manually specify, for example, which channels which should be marked as "bad" and removed from the list of available channels using the user interface. The operator can also rank channels according to their performance using the interface.

What is claimed is:

1. A method of interference-triggered frequency hopping in a wireless communication system, comprising:
   providing in the wireless communication system a master in wireless communication with a plurality of slave nodes configured to use different preselected communication frequencies to permit frequency hopping;
   selecting a current channel from among a plurality of channels in the wireless communication system in which the master and at least some of the slave nodes send and receive wireless communications, wherein the plurality of channels is stored in a list, each of the channels using different ones of the preselected communication frequencies;
   detecting interference in the current channel with communications between the master and a selected one of the slave nodes that use the current channel, wherein the detecting includes comparing an actual noise floor determined based on a received signal strength in the current channel and a signal to interference and noise ratio, with an expected noise floor;
   selecting a new channel of the channels different from the current channel only in response to detecting the interference; and
   switching from the current channel to the new channel such that communications between the master and the selected slave node use the new channel.

2. The method of claim 1, wherein the expected noise floor is calculated based on a thermal noise floor for the current channel and a receiver noise figure.

3. The method of claim 2, wherein the comparing includes determining whether the actual noise floor exceeds the expected noise floor by at least a detection threshold, and if so, determining that interference is present in the current channel.

4. The method of claim 1, wherein the selecting of the new channel is based on a pre-defined frequency hopping algorithm or a pre-computed frequency hop sequence.

5. The method of claim 4, wherein the switching to the new channel includes the master selecting the new channel, causing the selected slave node to lose communications with the master, and responsive thereto, the selected slave node carrying out the selecting the new channel as determined by the pre-defined frequency hopping algorithm or in accordance with the pre-computed frequency hop sequence.

6. The method of claim 1, wherein if the interference in the current channel is unacceptable, further comprising storing the current channel in a list of channels in which an unacceptable level of interference is present.

7. The method of claim 4, wherein responsive to switching from the current channel to the new channel, the method further comprises
   generating a new random seed for use in the pre-defined frequency hopping algorithm, or
   computing a new frequency hop sequence for use in the pre-computed frequency hop sequence.

8. A non-transitory computer-readable medium encoded with instructions that, when executed by one or more processors, implement a method of interference-triggered frequency hopping in a wireless communication system, the method comprising:
   providing in the wireless communication system a master in wireless communication with a plurality of slave nodes configured to use different preselected communication frequencies to permit frequency hopping;
   selecting a current channel from among a plurality of channels in the wireless communication system in which the master and at least some of the slave nodes send and receive wireless communications, wherein the plurality of channels is stored in a list, each of the channels using different ones of the preselected communication frequencies;
   detecting interference in the current channel with communications between the master and a selected one of the slave nodes that use the current channel, wherein the detecting includes comparing an actual noise floor determined based on a received signal strength in the current channel and a signal to interference and noise ratio, with an expected noise floor;
   selecting a new channel of the channels different from the current channel only in response to detecting the interference; and
   switching from the current channel to the new channel such that communications between the master and the selected slave node use the new channel.

9. The computer-readable medium of claim 8, wherein the selecting the new channel is based on a pre-defined frequency hopping algorithm or a pre-computed frequency hop sequence.

10. The computer-readable medium of claim 9, further comprising, before switching to the new channel, determining a performance associated with a next channel of the channels different from the new channel, and if the performance fails to satisfy a channel performance criterion, selecting a further channel of the channels different from the next channel; otherwise, if the performance satisfies the channel performance criterion, selecting the next channel as the new channel.

11. The computer-readable medium of claim 10, wherein the channel performance criterion includes whether a wireless communication link is established in the next channel between the master and the selected slave node such that the channel performance criterion is not satisfied if the wireless communication link fails within a predefined timeout to be established between the master and the selected slave node.

12. The computer-readable medium of claim 9, wherein the pre-defined frequency hopping algorithm includes a random number generator such that the new channel is randomly selected from among the plurality of channels.

13. The computer-readable medium of claim 9, wherein the pre-computed frequency hop sequence is based on a seed randomly generated by the master using a characteristic unique to the master, and wherein the frequency hop sequence is calculated by the master or by the selected slave node using the seed and a random number generator function.

14. The computer-readable medium of claim 13, wherein the pre-computed frequency hop sequence is calculated by the master and communicated to the at least some of the slave nodes.

15. The computer-readable medium of claim 8, wherein the expected noise floor is calculated based on a thermal noise floor for the current channel and a receiver noise figure.

16. The computer-readable medium of claim 15, wherein the comparing includes determining whether the actual noise floor exceeds the expected noise floor by at least a detection threshold, and if so, determining that interference is present in the current channel.

17. The computer-readable medium of claim 9, wherein the switching to the new channel includes the master selecting the new channel, causing the selected slave node to lose communications with the master, and responsive thereto, the selected slave node carrying out the selecting the new channel as determined by the pre-defined frequency hopping algorithm or in accordance with the pre-computed frequency hop sequence.

18. The computer-readable medium of claim 8, wherein if the interference in the current channel is unacceptable, further comprising storing the current channel in a list of channels in which an unacceptable level of interference is present.

19. A non-transitory computer-readable medium encoded with instructions that, when executed by one or more processors, implement a method of interference-triggered frequency hopping in a wireless communication system, the method comprising:
   providing in the wireless communication system a master in wireless communication with a plurality of slave nodes configured to use different preselected communication frequencies to permit frequency hopping;
   selecting a current channel from among a plurality of channels in the wireless communication system in which the master and at least some of the slave nodes send and receive wireless communications, wherein the plurality of channels is stored in a list, each of the channels using different ones of the preselected communication frequencies;
   detecting interference in the current channel with communications between the master and a selected one of the slave nodes that use the current channel;
   selecting another channel of the channels different from the current channel only in response to detecting the interference, wherein the selecting is based on a pre-defined frequency hopping algorithm or a pre-computed frequency hop sequence;
   determining a performance associated with the other channel, and
      if the performance fails to satisfy a channel performance criterion, selecting a further channel different from the current channel,
      otherwise, if the performance satisfies the channel performance criterion, switching from the current channel to the other channel such that communications between the master and the selected slave node use the other channel,
      wherein the channel performance criterion includes whether a wireless communication link is established between the master and the selected slave node such that the channel performance criterion is not satisfied if the wireless communication link fails within a pre-defined timeout to be established between the master and the selected slave node.

20. A non-transitory computer-readable medium encoded with instructions that, when executed by one or more processors, implement a method of interference-triggered frequency hopping in a wireless communication system, the method comprising:
   providing in the wireless communication system a master in wireless communication with a plurality of slave nodes configured to use different preselected communication frequencies to permit frequency hopping;
   selecting a current channel from among a plurality of channels in the wireless communication system in which the master and at least some of the slave nodes send and receive wireless communications, wherein the plurality of channels is stored in a list, each of the channels using different ones of the preselected communication frequencies;
   detecting interference in the current channel with communications between the master and a selected one of the slave nodes that use the current channel;
   selecting a new channel of the channels different from the current channel only in response to detecting the interference,
      wherein the selecting of the new channel is based on a pre-computed frequency hop sequence,
         wherein the pre-computed frequency hop sequence is calculated by the master using a random number generator function and a seed randomly generated by the master using a characteristic unique to the master, and
         communicated to at least some of the slave nodes; and
   switching from the current channel to the new channel such that communications between the master and the selected slave node use the new channel.

* * * * *

UNITED STATES PATENT AND TRADEMARK OFFICE
CERTIFICATE OF CORRECTION

PATENT NO.        : 8,428,101 B1
APPLICATION NO.   : 13/670158
DATED             : April 23, 2013
INVENTOR(S)       : Sarca et al.

It is certified that error appears in the above-identified patent and that said Letters Patent is hereby corrected as shown below:

On the Title Page, Item (72) Inventors:

Please delete "Aurei" and insert -- Aurel --, therefor.

Signed and Sealed this
Twelfth Day of November, 2013

Teresa Stanek Rea
*Deputy Director of the United States Patent and Trademark Office*